United States Patent [19]

Sonoda et al.

[11] Patent Number: 5,239,603
[45] Date of Patent: Aug. 24, 1993

[54] INTEGRALLY-MOLDED CERAMIC ALIGNMENT SLEEVE FOR OPTICAL FIBER CONNECTOR AND METHOD OF PRODUCING THE SAME

[75] Inventors: Hideto Sonoda; Toshiyuki Matsumoto, both of Kitami, Japan

[73] Assignees: Kyocera Corporation, Kyoto; Sanwa Denki Kogyo Co., Ltd., Tokyo, both of Japan

[21] Appl. No.: 897,013

[22] Filed: Jun. 11, 1992

[30] Foreign Application Priority Data

Jun. 12, 1991 [JP] Japan ............................... 3-43909[U]
Nov. 20, 1991 [JP] Japan ............................... 3-304529

[51] Int. Cl.⁵ .......................... G02B 6/26; B29D 41/00
[52] U.S. Cl. .......................................... 385/70; 385/52; 385/60; 385/66; 264/1.1; 264/1.5
[58] Field of Search ...................... 385/52, 58, 60, 65, 385/66, 70, 72, 77, 78, 84, 138; 264/1.1, 1.2, 1.5, 2.1, 2.2, 2.3

[56] References Cited

U.S. PATENT DOCUMENTS

| | | | |
|---|---|---|---|
| 4,193,665 | 3/1980 | Arnold | 385/72 X |
| 4,487,474 | 12/1984 | Nishie et al. | 385/66 X |
| 4,541,685 | 9/1985 | Anderson | 385/72 |
| 4,636,034 | 1/1987 | Kashimura et al. | 385/72 |
| 5,066,096 | 11/1991 | Krausse | 385/58 |
| 5,103,680 | 4/1992 | Kanayama et al. | 73/849 |
| 5,177,808 | 1/1993 | Satake et al. | 385/70 X |
| 5,179,607 | 1/1993 | Sellers et al. | 385/70 |

FOREIGN PATENT DOCUMENTS

| | | | |
|---|---|---|---|
| 0080722 | 6/1983 | European Pat. Off. | 385/70 X |
| 0433177 | 6/1991 | European Pat. Off. | 385/70 X |
| 2931018 | 2/1981 | Fed. Rep. of Germany | 385/70 X |
| 3704790 | 8/1988 | Fed. Rep. of Germany | 385/70 X |
| 1-032210 | 2/1989 | Japan | 385/70 X |
| 64-56405 | 3/1989 | Japan | 385/70 X |

Primary Examiner—Brian Healy
Attorney, Agent, or Firm—Spensley Horn Jubas & Jubas

[57] ABSTRACT

An integrally-molded ceramic cylindrical alignment sleeve is composed of a cylindrical sleeve body and at least three convex portions located on the inner surface of the sleeve body, each of the convex portions extending from one end to the other in the longitudinal direction of the sleeve body, with the upper surface of each of the convex portions being formed in the shape of a reverse arc and the section where each of the convex portions connects to the inner surface of the sleeve body being in the shape of a continuous R. A method of producing this integrally-molded ceramic cylindrical alignment sleeve is disclosed.

6 Claims, 3 Drawing Sheets

INTEGRALLY-MOLDED CERAMIC ALIGNMENT SLEEVE FOR OPTICAL FIBER CONNECTOR AND METHOD OF PRODUCING THE SAME

BACKGROUND OF THE INVENTION

1. Field of the Invention

The present invention relates to an integrally-molded ceramic alignment sleeve for use in an optical fiber connector for connecting optical fibers, which is used in optical communication systems and optical fiber sensors, and more particularly to an integrally-molded ceramic alignment sleeve with a high strength into which a ferrule can be precisely fitted with a good insertion feel. This invention also relates to a method of producing the above-mentioned integrally-molded ceramic alignment sleeve at low cost.

2. Discussion of Background

Conventionally, an optical fiber connector employing a zirconia ferrule is widely used in the field of optical communications. An integrally-molded split phosphor bronze or zirconia alignment sleeve is used as an adaptor for the above optical fiber connector. Particular attention is being paid to the split zirconia alignment sleeve because no metal powder is created during attachment or detachment of the ferrule, and excellent optical connection performance can be attained.

A conventional ceramic split alignment sleeve is in a cylindrical form as shown in FIG. 5, provided with a slit extending in the longitudinal direction of the sleeve. The inner surface of the sleeve is subjected to precision abrasion using diamond grain in such a way that the inner diameter of the sleeve is slightly smaller than the outer diameter of a ferrule to be inserted therein.

In the manufacture of the ceramic split alignment sleeve as shown in FIG. 5, however, the flowability of the diamond grain is poor because there is no relief on the inner surface of the sleeve. Furthermore, the area to be subjected to abrasion finishing is large, therefore the processability is poor and considerable time is expended in abrasion finishing. The problem also exists that the straightness of the split alignment sleeve in the longitudinal direction is not satisfactory because the flowability of the diamond grain is poor. Moreover, the variation of the necessary force to remove the ferrule from the thus prepared split sleeve after insertion is large. Therefore, when a split alignment sleeve with a good insertion feel is required, this variation causes the yield of finished products to worsen.

According to the technology disclosed in Japanese Laid-Open Patent Application 64-32210, by the provision of a convex portion with an arc-shaped cross-section extending in the longitudinal direction at three locations in the circumferential direction on the inner surface of a split alignment sleeve with a longitudinal slit, it is possible to steadily fit the ferrule into the split sleeve under pressure and secure the ferrule with stable pressure so that the force required to attach the ferrule to the sleeve or detach it therefrom can be considerably reduced. This kind of sleeve with convex portions is integrally molded from a metal or plastic. Alternatively, the sleeve body is formed from a plastic and then the convex portions are provided in the sleeve body by insert-molding of metal, ceramic or glass rods. In other words, the sleeve body itself and the convex portions with an arc-shaped cross-section are separate bodies.

In the above-mentioned Japanese Laid-Open Patent Application, there is no description that the sleeve body and the convex portions with the arc-shaped cross-section are integrally molded using a ceramic material. It is natural to assume that the internal processing of an integrally-molded ceramic product of a shape such as this is extremely difficult.

Also, since the convex portion is formed with an arc-shaped cross-section, the ferrule comes into line contact with the convex portion, so that the optical performance is ultimately governed by the roundness of the ferrule.

In addition, even with an integrally-molded ceramic alignment sleeve provided with convex portions, for instance, when the ferrule is inserted into the sleeve, stress concentration is produced at the section where each convex portion is connected to the internal surface of the sleeve body, and the mechanical strength of this type of sleeve becomes a problem.

Furthermore, when the sleeve body and the convex portions are separate members as disclosed in Japanese Laid-Open Patent Application 64-32210, a large number of manufacturing steps are required resulting in increased costs.

SUMMARY OF THE INVENTION

Accordingly, a first object of the present invention is to provide an integrally-molded ceramic cylindrical alignment sleeve with a high mechanical strength for use in an optical fiber connector, into which a ferrule can be snugly fitted with a good insertion feel.

A second object of the present invention is to provide a method of producing the above-mentioned integrally-molded ceramic alignment sleeve at low cost with a good yield.

The first object of the present invention can be achieved by an integrally-molded ceramic cylindrical alignment sleeve comprising a cylindrical sleeve body and at least three convex portions located on the inner surface of the cylindrical sleeve body, each of the convex portions extending from one end to the other in the longitudinal direction of the sleeve body, with the upper surface of each convex portion being formed in the shape of a reverse arc and the section where the convex portion connects to the inner surface of the sleeve body being radiused to form a continuous R. This integrally-molded ceramic cylindrical alignment sleeve may include a slit which extends in the longitudinal direction thereof.

The second object of the present invention can be achieved by a method of producing an integrally-molded ceramic cylindrical alignment sleeve which comprises the steps of integrally molding ceramic into a cylindrical sleeve body with at least three convex portions located on the inner surface of the sleeve body, which convex portions extend from one end to the other in the longitudinal direction of the sleeve body, with the upper surface of the convex portion being formed in the shape of a reverse arc and the section where the convex portion connects to the inner surface of the sleeve body being radiused to form a continuous R; sintering the cylindrical sleeve body with the convex portions; and abrading the upper surfaces of the sintered convex portions. When this integrally-molded ceramic cylindrical alignment sleeve includes a slit which extends in the longitudinal direction thereof, a step of forming the slit is also included in the above method.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
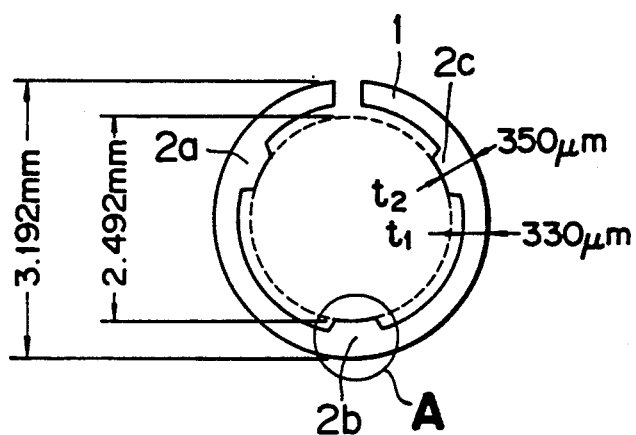
FIG. 1 is a cross-sectional view showing one embodiment of an integrally-molded ceramic alignment sleeve with a slit according to the present invention.

FIG. 1 is a cross-sectional view showing one embodiment of an integrally-molded ceramic alignment sleeve with a slit according to the present invention. On the inner surface of a cylindrical sleeve body 1, convex portions 2a, 2b and 2c extending longitudinally from on end to the other of the sleeve body 1 are provided, with the convex portions 2a, 2b and 2c uniformly spaced in the circumferential direction of the sleeve body 1 with an adequate interval. The upper surfaces of the convex portions 2a, 2b and 2c are abraded to form a reversed arc shape (an arc shape centered around the cylindrical axis of the sleeve body 1) and the section where each convex portion connects to the inner surface of the sleeve body 1 is gently radiused to form a continuous R. The upper surfaces of the convex portions 2a, 2b and 2c are in the shape of an arc with a radius of curvature smaller than the radius of curvature of the ferrule to be inserted in the sleeve, so that the ferrule can be fitted into the sleeve without producing looseness.

To obtain a proper radius value of the section where the convex portion connects to the inner surface of the sleeve body, the breaking load tests were carried out, with the radius value of the convex portion shown in FIG. 1 being changed to 0.030 mm, 0.1 mm and 0.5 mm. In the breaking load tests, the number of test samples with the radius of 0.030 mm was 53 and the number of test samples with the radius of 0.1 mm, and the number of test samples with the radius of 0.5 mm were respectively 30.

Figure 2A:
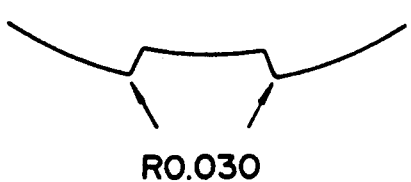
FIG. 2(a) and FIG. 2(b) are partially enlarged views of the section A in FIG. 1 with different radius values of a section where the convex portion connects to the inner surface of the sleeve body of the alignment sleeve.
Figure 2B:
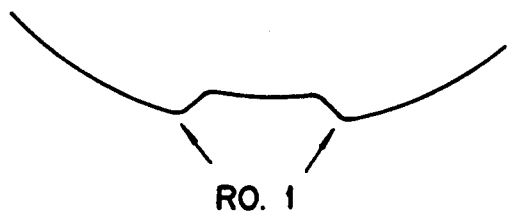
Figure 3A:
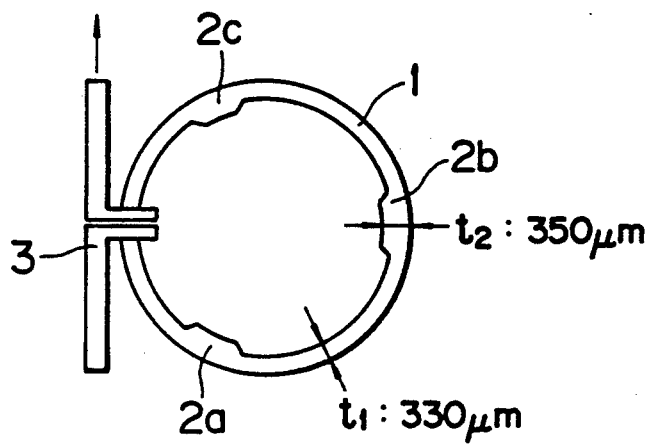
FIG. 3(a) is a schematic illustration for explaining breaking load tests conducted on the split alignment sleeve shown in FIG. 1.

FIG. 2(a) and FIG. 2(b) are enlarged views of the section A in FIG. 1, with a radius R = 0.030 mm in FIG. 2(a), and a radius R = 0.1 mm in FIG. 2(b). In the breaking load tests, a movable part 3 of a measuring instrument is inserted into the slit of a split alignment sleeve as shown in FIG. 3(a). One end of the movable part 3 is secured and a load is applied to the other end in the direction of the arrow to cause the split alignment sleeve to open. The conditions of this breaking load test were as follows:

Wall thickness $t_1$ of sleeve body: 330 μm
Total wall thickness $t_2$: 350 μm
Opening speed: 5 mm/min.
Temperature: 25° C.
Humidity: 59%

The test results are given in the following Table 1.

TABLE 1

|  | Average Breaking Load | Weibull's Coefficient |
|---|---|---|
| R = 0.030 | 4.79 kgf | 10.372 |
| R = 0.10 | 7.45 kgf | 13.60 |
| R = 0.50 | 8.46 kgf | 13.2 |

Figure 3B:
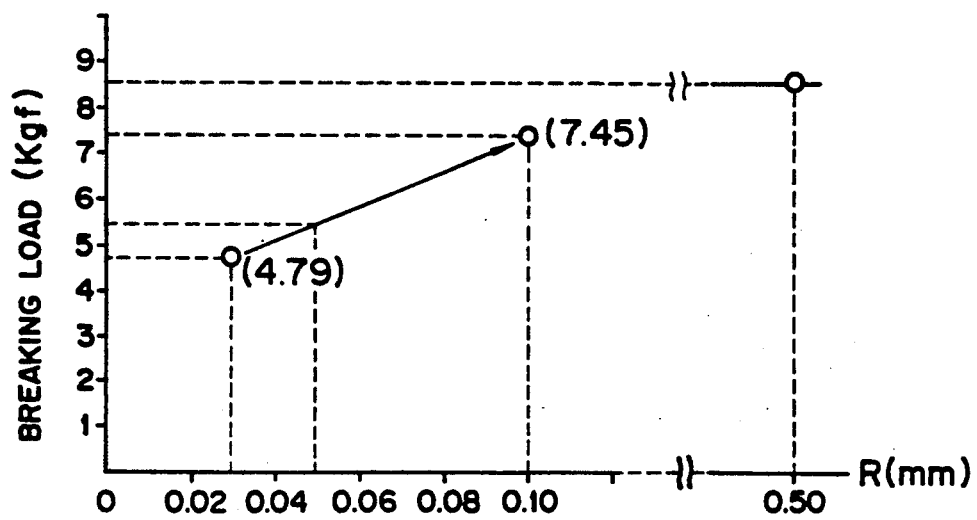
FIG. 3(b) is a graph showing the relationship between the breaking load and the radius value of the section where the convex portion connects to the inner surface of the alignment sleeve.

FIG. 3(b) is a graph showing the results of the above-mentioned breaking load tests, with R (radius) as the X-axis and the breaking load in kgf as the Y-axis.

It is clear that the ferrule to be inserted into this sleeve is supported at the three convex portions and stress concentration is applied to each connecting section where the convex portion connects to the inner surface of the sleeve body. In particular, the stress concentration applied to the connecting section of the convex portion 2b, located on the opposite side to the slit of the sleeve body, should be larger as compared with any case where the number of convex portions is four or more. Accordingly, the minimum radius value ca be determined for the gentle radius condition by reading from the graph of FIG. 3(b) the radius value corresponding to the minimum breaking load applied to the split alignment sleeve for practical use. Since a practical breaking load required on the split alignment sleeve in which a ferrule is supported at three points is considered to be about 5 kgf or more, the slit alignment sleeve can stand the above-mentioned breaking load when the radius value is about 0.05 mm or more as can be seen from the graph in FIG. 3(b).

More specifically, in view of FIG. 3(b), the requirement for an average breaking load of about 5 kgf can be satisfied even when R is about 0.04 mm. However, in view of the dispersion of the accuracy of the products, and the yield of the products, it is preferable that the radius value (R) be about 0.05 mm or more.

Because the integrally-molded ceramic cylindrical alignment sleeve of the present invention as described above has a simple shape, it is easy to mold. The internal processing after sintering also may be accomplished by merely subjecting the upper surfaces of the convex portions to abrasion finishing. Therefore, the processing time is curtailed to a large extent in comparison with the manufacturing process of a conventional alignment sleeve. In addition, there are adequate intervals between the adjoining convex portions 2a, 2b, 2c respectively, so that the flowability of the diamond grain used in the internal processing is therefore extremely good. This results in great improvement in the longitudinal straightness of the convex portions. In other words, an adequate interval between the adjoining convex portions may be determined so as to clearly obtain the improvement in straightness of the convex portion.

Moreover, because the straightness of the convex portions of the alignment sleeve according to the present invention is extremely good, the necessary force to remove a ferrule from the sleeve is constantly stable. In the case where a good insertion feel of the ferrule into the sleeve is required, production of the sleeves is generally controlled by the above-mentioned necessary force to remove the ferrule from the sleeve. Therefore, according to the present invention, the yield can be greatly improved. For example, in the case of the conventional zirconia alignment sleeve, the necessary force to remove a ferrule from the sleeve ranges from 120 to 420 gf when the inner diameter of the sleeve is within the range from 2.491 mm to 2.496 mm. As opposed to this variation of 300 gf, the necessary force to remove the ferrule from the integrally-molded ceramic cylindrical alignment sleeve according to the present invention ranges from 100 to 260 gf, with a variation of 160 gf. Understandably, therefore, the variation in the necessary force to remove a ferrule from the alignment sleeve of the present invention can be drastically stabilized.

The integrally-molded ceramic alignment sleeve with three convex portions is described in the above embodiment, but this is in no way restrictive of the present invention. Four or more convex portions may be provided on the inner surface of the sleeve body. In this case with the improved effect of the flowability of diamond grain in the course of internal processing taken into consideration, it is necessary that the adjoining convex portions be spaced at adequate intervals. Also, to shorten the abrasion processing time for the upper surfaces of the convex portions, it is better to reduce the area to be subjected to abrasion processing. Therefore, in the case where the number of convex portions is increased, it is desirable that the size of each convex portion be made as small as possible.

The method of producing the above-mentioned integrally-molded ceramic cylindrical alignment sleeve for use in the optical connector according to the present invention will now be explained in detail with reference to the flow diagram shown in FIG. 4.

Figure 4:
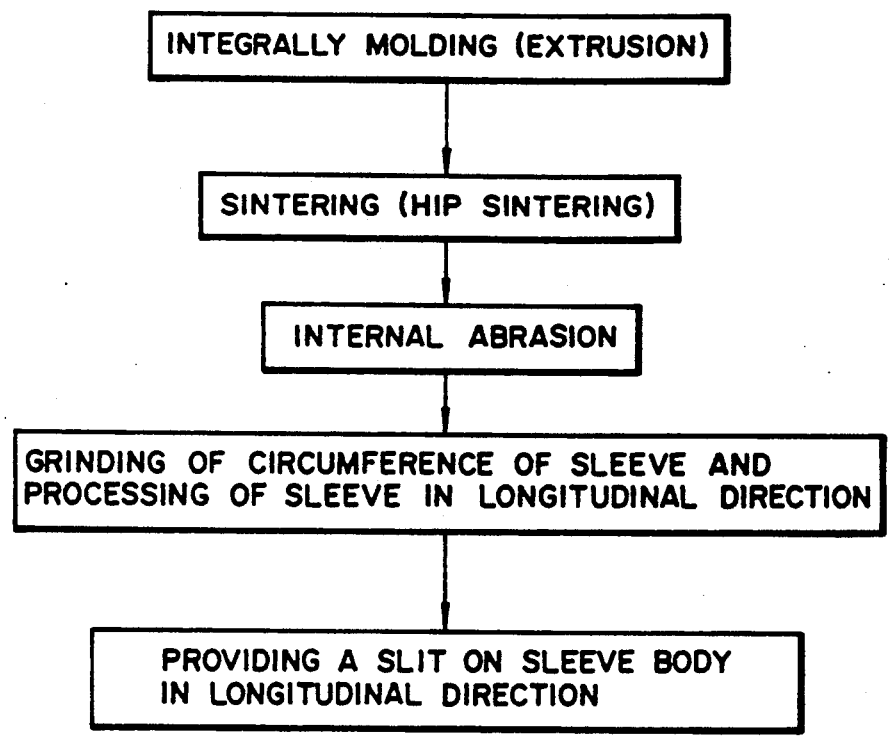
FIG. 4 is a flow diagram showing the manufacturing process of the integrally-molded ceramic alignment sleeve according to the present invention.
Figure 5:
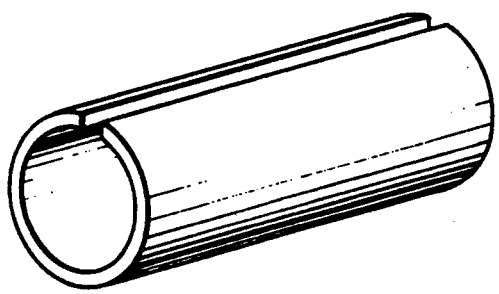
FIG. 5 is a perspective view of a conventional split ceramic alignment sleeve.

As shown in FIG. 4, in a molding process, using a metal mold, a ceramic raw material is formed by extrusion into an elongated cylindrical sleeve body with such an inner surface structure as outlined above. Specifically, at least three convex portions running from one end to the other in the longitudinal direction of the cylindrical alignment sleeve are located on the inner surface of the sleeve body, uniformly spacing o the circumferential direction of the sleeve with adequate intervals. The upper surfaces of the convex portions are in the form of reverse arc (arc shape centered around the cylindrical axis of the sleeve body), and, in addition, the sleeve body and the convex portions are integrally molded in such a way that the section where each convex portion connects to the inner surface of the sleeve body is radiused to form a continuous R.

After the completion of molding, the molded product is sintered. Even with normal sintering, the ceramic alignment sleeve according to the present invention has a high breaking strength and the variation of the breaking strength and that of the necessary force to remove the ferrule from the sleeve are small because the ceramic sleeve body and the convex portions are integrally molded according to the present invention. By using HIP (hot-isostatic-press) sintering, the breaking strength of the sleeve of this shape can be increased, and the variation of the breaking strength and that in the necessary force to remove the ferrule from the sleeve can be made even smaller.

Subsequently, the upper surfaces of the convex portions provided on the inner surface of the sleeve body are subjected to abrasion finishing.

The thus obtained long sleeve body is subjected to grinding in the circumferential direction and in the longitudinal direction and then cut into a plurality of sleeve bodies with a predetermined length for use in the ceramic cylindrical alignment sleeve of the present invention. The edges of each of the thus cut sleeve bodies are then subjected to abrasion finishing, whereby sleeve bodies for use in the present invention are prepared.

When the ceramic alignment sleeve of the present invention has a slit in the longitudinal direction, a slit is provided after the grinding process. Thus, the integrally-molded ceramic cylindrical alignment sleeve according to the present invention can be obtained.

As previously mentioned, the breaking strength of the sleeve can be further improved when the HIP sintering is employed in the sintering process. To confirm the above fact, the breaking strength test was conducted using 50 samples of the integrally-molded ceramic split alignment sleeve subjected to HIP sintering, with the radius value of the section where the convex portion connects to the inner surface of the sleeve being 0.10. As a result, the breaking load was 7.66 kgf on average and the Weibull's coefficient was observed to be markedly improved at 15.81. The variation in the breaking strength can be drastically reduced.

As stated above, according to the present invention, the cylindrical sleeve body and the convex portions are integrally molded from a ceramic material. Then, the integrally molded sleeve is sintered, followed by abrasion finishing of the upper surfaces of the convex portions. This fabrication can be carried out in an extremely short time although the number of manufacturing processes is the same as for the conventional process.

In addition, by integrally molding the sleeve body and the convex portions from a ceramic raw material and then sintering the molded sleeve, the breaking strength of the sleeve can be increased and the variations in the breaking strength and the necessary force to remove the ferrule from the sleeve can be decreased. Furthermore, by applying the HIP sintering, it is possible to further improve the breaking strength of the sleeve and to obtain very small variations of the breaking strength and the necessary force to remove the ferrule from the sleeve.

Accordingly, an integrally-molded ceramic alignment sleeve with high quality can be produced at an extremely low cost by the producing method of the present invention.

What is claimed is:

1. An integrally-molded ceramic cylindrical alignment sleeve for securely holding a ferrule which is connected to an optical fiber comprising:
   (a) a cylindrical sleeve body provided with a slit in the longitudinal direction thereof, and
   (b) at least three convex portions located on the inner surface of said sleeve body, each of said convex portions extending from one end to the other in the longitudinal direction of said sleeve body, with the upper surface of each of said convex portions being formed in the shape of a reverse arc and constituting a surface which contacts the ferrule and the section where each of said convex portions connects to the inner surface of said sleeve body being rounded with a continuous radius of curvature.

2. The integrally-molded ceramic cylindrical alignment sleeve as claimed in claim 1, wherein the radius of curvature of said section where each of said convex portions connects to the inner surface of said sleeve body is about 0.05 mm or more.

3. A method of producing an integrally-molded ceramic cylindrical alignment sleeve for securely holding a ferrule which is connected to an optical fiber which comprises the steps of:
  (a) integrally molding a ceramic material into a cylindrical sleeve body provided with at least three convex portions located on the inner surface of said sleeve body, each of said convex portions extending from one end to the other in the longitudinal direction of said sleeve body, with the upper surface of each of said convex portions being formed in the shape of a reverse arc and constituting a surface which contact the ferrule and the section where each of said convex portions connects to the inner surface of said sleeve body being rounded with a continuous radius of curvature;
  (b) sintering said cylindrical sleeve body with said convex portions; and
  (c) abrading the upper surfaces of said convex portions.

4. A method of producing an integrally-molded ceramic cylindrical split alignment sleeve for securely holding a ferrule which is connected to an optical fiber which comprises the steps of:
  (a) integrally molding a ceramic material into a cylindrical sleeve body provided with at least three convex portions located on the inner surface of said sleeve body, each of said convex portions extending from one end to the other in the longitudinal direction of said sleeve body, with the upper surface of each of said convex portions being formed in the shape of a reverse arc and constituting a surface which contacts the ferrule and the section where each of said convex portions connects to the inner surface of said sleeve body being rounded with a continuous radius of curvature;
  (b) sintering said cylindrical sleeve body with said convex portions;
  (c) abrading the upper surfaces of said convex portions; and
  (d) forming a slit in the longitudinal direction of said cylindrical sleeve body.

5. The method of producing an integrally-molded ceramic cylindrical alignment sleeve as claimed in claim 3, wherein said cylindrical sleeve with said convex portions is subjected to HIP sintering in the sintering process.

6. The method of producing an integrally-molded ceramic cylindrical split alignment sleeve as claimed in claim 4, wherein said cylindrical sleeve body with said convex portions is subjected to HIP sintering in the sintering process.

* * * * *